United States Patent
Jo et al.

(10) Patent No.: US 10,130,931 B2
(45) Date of Patent: Nov. 20, 2018

(54) SUPER ABSORBENT POLYMER AND METHOD OF PREPARING THE SAME

(71) Applicants: SK INNOVATION CO., LTD, Seoul (KR); SK GLOBAL CHEMICAL CO., LTD., Seoul (KR)

(72) Inventors: Byoung-Cheon Jo, Seoul (KR); Du-Youn Ka, Daejeon (KR); Ju-Hee Kim, Daejeon (KR); Byoung-Tak Yim, Daejeon (KR)

(73) Assignees: SK INNOVATION CO., LTD., Seoul (KR); SK GLOBAL CHEMICAL CO., LTD., Seoul (KR)

( * ) Notice: Subject to any disclaimer, the term of this patent is extended or adjusted under 35 U.S.C. 154(b) by 174 days.

(21) Appl. No.: 15/011,719

(22) Filed: Feb. 1, 2016

(65) Prior Publication Data

US 2016/0220983 A1 Aug. 4, 2016

(30) Foreign Application Priority Data

Jan. 30, 2015 (KR) .......................... 10-2015-0014895

(51) Int. Cl.
| | |
|---|---|
| *B01J 20/26* | (2006.01) |
| *B01J 20/28* | (2006.01) |
| *C08F 220/06* | (2006.01) |
| *B01J 20/30* | (2006.01) |

(52) U.S. Cl.
CPC ....... *B01J 20/28016* (2013.01); *B01J 20/261* (2013.01); *B01J 20/267* (2013.01); *B01J 20/28004* (2013.01); *B01J 20/28011* (2013.01); *B01J 20/3007* (2013.01); *B01J 20/3021* (2013.01); *C08F 220/06* (2013.01)

(58) Field of Classification Search
CPC ............. B01J 20/28016; B01J 20/3021; B01J 20/3007; B01J 20/267; B01J 20/28011; B01J 20/28004; B01J 20/261; C08F 220/06
USPC ........................................................ 502/402
See application file for complete search history.

(56) References Cited

U.S. PATENT DOCUMENTS

2012/0035294 A1  2/2012  Kim et al.

FOREIGN PATENT DOCUMENTS

| EP | 2643392 B1 * | 12/2014 | ............ B01J 20/267 |
|---|---|---|---|
| JP | 2009-256687 A | 11/2009 | |
| KR | 10-2006-0027360 A | 3/2006 | |
| KR | 10-2012-0054836 A | 5/2012 | |

OTHER PUBLICATIONS

Notice of Allowance dated Sep. 25, 2015 from Korean Intellectual Property Office in a counterpart Korean Patent Application No. 10-2015-0014895 (all the cited references are listed in this IDS.).

* cited by examiner

*Primary Examiner* — Haytham Soliman
(74) *Attorney, Agent, or Firm* — The PL Law Group, PLLC

(57) ABSTRACT

Disclosed are a granular super absorbent polymer, including particles (A) having an average diameter of 150 to 850 μm, wherein the particles (A) includes particles (a1) having an average diameter of 500 to 850 μm; and particles (a2) having an average diameter of 150 to 250 μm, and the particles (a1 and a2) have a water-solubility index of 0.08 to 2.0 (represented by Equation 1), thereby it is possible to maintain a proper amount of extractables in a resin, and to exhibit excellent flow conductivity and water absorption ability in a case of being actually applied to products, without inducing any skin problem when, as well as a preparation method thereof.

10 Claims, No Drawings

SUPER ABSORBENT POLYMER AND METHOD OF PREPARING THE SAME

CROSS-REFERENCE TO RELATED APPLICATION

This application claims priority to and the benefit of Korean Patent Application No. 10-2015-0014895, filed on Jan. 30, 2015, the disclosure of which is incorporated herein by reference in its entirety.

BACKGROUND

1. Field of the Invention

The present invention relates to a super absorbent polymer and a method of preparing the same.

2. Description of the Related Art

A super absorbent polymer is a functional resin having an ability of absorbing water of several tens to thousands of times the weight of the polymer and keeping the same therein, and thus, is broadly used in various products including—hygienic products such as sanitary goods, medical patches, agricultural absorbents, absorptive pads for foodstuffs, cable protective films, or the like.

The super absorbent polymer is generally used in a powder form, and when it is applied to a product, it is usually used in combination with a fibrous substrate made of natural fiber or synthetic fiber.

Such a super absorbent polymer is prepared and used as a type of hydrogel phase polymer with excellent physical properties. In general, the hydrogel phase polymer is obtained by a polymerization reaction of a raw material, followed by drying, grinding and classification processes to prepare a resin. In order to increase effects such as absorption properties, water retention ability, flow conductivity (i.e., permeability), etc., a variety of studies such as the provision of additional surface treatment processes, the alteration of different process conditions, etc. have been conducted.

Among such a process of preparing the super absorbent polymer, during a polymerization process, a number of oligomers having insufficiently increased molecular weight (waster-soluble fraction, 'extractables') may be generated in the resin. If the extractables exist in large quantity, these may be dissolved in water or the like, when the polymer is actually applied to products, hence causing a problem of being easily dissolved in water and eluted out of the products. In particular, when the polymer is applied to the hygienic product such as a paper (disposable) diaper, sanitary napkin, etc., or medical patches, it entails a problem of drastically deteriorating the performance of the product such as the induction of skin problems.

U.S. Patent Publication No. 2012-0035294 discloses a super absorbent polymer, however, did not solve some problems of a deterioration in physical properties such as water absorption and water retention abilities, and flow conductivity, and an induction of skin problems.

SUMMARY

Accordingly, an aspect of the present invention is to provide a granular super absorbent polymer capable of exhibiting excellent flow conductivity.

In addition, another aspect of the present invention is to provide a granular super absorbent polymer that does not induce skin problems when it is actually applied to a product.

Further, another aspect of the present invention is to provide a method of preparing a super absorbent polymer exhibiting excellent physical properties.

One or more of the above aspects of the present invention will be achieved by the following characteristics:

(1) A granular super absorbent polymer, including particles (A) having an average diameter of 150 to 850 μm, wherein the particles (A) includes particles (a1) having an average diameter of 500 to 850 μm; and particles (a2) having an average diameter of 150 to 250 μm, and the particles (a1 and a2) have a water-solubility index of 0.08 to 2.0, which is represented by Equation 1 below:

$$\text{Water-solubility index} = \text{positive square root of } [(A1-A2)^2/A3] \quad \text{[Equation 1]}$$

wherein A1 is a content ratio of extractables in a1, A2 is a content ratio of extractables in a2, and A3 is a content ratio of extractables in A.

(2) The granular super absorbent polymer according to the above (1), wherein the water-solubility index ranges from 0.09 to 1.4.

(3) The granular super absorbent polymer according to the above (1), wherein the water-solubility index ranges from 0.1 to 0.7.

(4) The granular super absorbent polymer according to any one of the above (1) to (3), further includes a monomer residue, wherein a weight of the monomer residue to a weight of the super absorbent polymer ranges from 0.1 to 400 ppm.

(5) The granular super absorbent polymer according to any one of the above (1) to (3), wherein a flow conductivity of the granular super absorbent polymer is 10 darcy or more.

(6) The granular super absorbent polymer according to any one of the above (1) to (3), wherein a flow conductivity of the granular super absorbent polymer is 25 darcy or more.

(7) A method of preparing the granular super absorbent polymer according to the above (1), including polymerization, drying, grinding and surface cross-linking processes, wherein the polymerization process is conducted using a comonomer which includes at least two hydroxyl groups in a molecule.

(8) The method according to the above (7), wherein a dimer of an acrylic acid monomer is added in an amount of 0.1 to 1,000 ppm to a total weight of monomer to be polymerized into the super absorbent polymer in the polymerization process.

(9) The method according to the above (7), wherein at least one selected from a group consisting of acrolein, furfural, maleic acid anhydride and protoanemonin is added in an amount of 0.1 to 15 ppm to a total weight of monomer to be polymerized into the super absorbent polymer in the polymerization process.

(10) A method of preparing the granular super absorbent polymer according to the above (1), including polymerization, drying, grinding and surface cross-linking processes, further including an extrusion process after the polymerization process, wherein a polymerization initiator and a surface cross-linking agent are introduced during the extrusion process.

(11) A method of preparing the granular super absorbent polymer according to the above (1), including polymerization, drying, grinding and surface cross-linking processes, wherein the surface cross-linking process is conducted using a surface cross-linking solution in an amount of 1 to 10% by weight to a total weight of the granular super absorbent polymer before the surface treatment process.

(12) The method according to the above (1), wherein the surface cross-linking solution includes aqueous alcohol in an amount of 0.1 to 50% by weight to a total weight of the solution.

The super absorbent polymer of the present invention maintains a proper amount of extractables, thereby exhibiting excellent flow conductivity and water absorption ability.

The super absorbent polymer of the present invention does not induce any skin problems when it is applied to products.

DETAILED DESCRIPTION

The present invention discloses a granular super absorbent polymer, including particles (A) having an average diameter of 150 to 850 µm, wherein the particles (A) includes particles (a1) having an average diameter of 500 to 850 µm; and particles (a2) having an average diameter of 150 to 250 µm, and the particles (a1 and a2) have a water-solubility index of 0.08 to 2.0 (represented by Equation 1), thereby it may be possible to maintain a proper amount of extractables in a resin, and to exhibit excellent flow conductivity and water absorption ability in a case of being actually applied to products, without inducing any skin problem when, as well as a preparation method thereof.

In general, a super absorbent polymer has a plurality of components having an insufficiently increased molecular weight during its production process (water-soluble fractions, i.e., extractables) included in a resin. If the extractables are included in an excess amount beyond a proper range, flow conductivity (i.e., permeability) may be reduced. When it is actually applied to a product, the fractions were easily eluted by body fluids such as urine. If the eluted extractables are discharged out of the product and contact with skin, it may cause skin problems.

However, the granular super absorbent polymer according to an embodiment of the present invention satisfies a water-solubility index in a proper range, thereby it is possible to enhance flowability and propagation between particles, that is, flow conductivity of the product. Furthermore, when it is actually applied to products including, for example, hygienic products such as a paper diaper, sanitary napkin, etc., medical patches, or the like, skin problems do not induce.

Hereinafter, exemplary embodiments of the present invention will be described in more details.

<Super Absorbent Polymer>

The granular super absorbent polymer according to one embodiment of the present invention includes particles (A) having an average diameter of 150 to 850 µm, wherein the particles (A) includes particles (a1) having an average diameter of 500 to 850 µm, and particles (a2) having an average diameter of 150 to 250 µm, and the particles (a1 and a2) have a water-solubility index of 0.08 to 2.0, which is represented by Equation 1 below.

$$\text{Water-solubility index} = \text{positive square root of } [(A1-A2)^2/A3] \quad \text{[Equation 1]}$$

wherein A1 is a content ratio of extractables in a1, A2 is a content ratio of extractables in a2, and A3 is a content ratio of extractables in A).

In the present invention, a1 means a first set of particles included in an entire resin, and the first set of particles has an average diameter in the range of 500 to 850 µm; a2 means a second set of particles included in the entire resin, and the second set of particles has an average diameter in the range of 150 to 250 µm; and A means a set of particles included in the entire resin, which have an average diameter in the range of 150 to 850 µm.

Further, in the present invention, the water-soluble fraction (herein, also referred to as "extractables," and briefly "Ext") means a component of the product eluted into water (liquid eluent) that induces skin problems when it contacts with the skin.

The extractables may be determined by an EDANA method (WSP 270.2.R3) for measuring a super absorbent polymer prepared under atmospheric pressure after immersing the resin in an aqueous solution of brine with 200 times the weight of resin for 4 hours.

The granular super absorbent polymer according to one embodiment of the present invention satisfies the water-solubility index represented by Equation 1, and may reduce a rate of extractables relative to particles having an average diameter of 500 to 850 µm, so as to maintain a proper range of extractables in an entire super absorbent polymer. Therefore, when using the resin in a product, excellent flow conductivity and water absorption ability may be expressed. Further, an induction of the skin problems may be effectively inhibited.

The particle (a2) having an average diameter of 150 to 250 µm may enhance absorption rate and absorption performance due to relatively a higher specific surface area. In a case of the particle (a1) having an average diameter of 500 to 850 µm, the particle has a large size, and thus, is not easily scattered but uniformly distributed in the product. Further, when the product is provided with a liquid, it does not irregularly move to thus improve propagation of liquid, that is, the flow conductivity.

However, since the particles (a1) having an average diameter of 500 to 850 µm have a relatively larger size and contain a large amount of extractables therein, it is important that these extractables are maintained in a proper range in order to improve physical properties of the product. In this regard, the embodiment of the present invention satisfies the water-solubility index represented by Equation 1, thus simultaneously achieving both of effects that improve the flow conductivity and water absorption ability while inhibiting an induction of the skin problems.

The granular super absorbent polymer according to one embodiment of the present invention may have a water-solubility index represented by Equation 1 in a range of 0.09 to 1.4, and preferably, 0.1 to 0.7 in an aspect of decreasing a content of the extractables and a deviation thereof.

Within the above range, the deviation in contents of the extractables in the particles may be maintained in a proper range, thus expecting improvement in physical properties of the product. Meanwhile, if the water-solubility index represented by Equation 1 is less than 0.08 or exceeding 2.0, the flow conductivity of body fluid may be considerably reduced and skin problems may easily induce.

Equation 1 according to one embodiment of the present invention may be accomplished by various methods. For example, generation of extractables may be controlled by altering particular components and contents thereof in a comonomer used during a polymerization reaction, or by adding a reaction control material in a specific content during a polymerization process. Further, additional extrusion with a compound capable of conducting an additional-reaction after polymerization may be conducted, or the additional-reaction may be executed by controlling components of a cross-linking agent or solvent and contents thereof in a surface cross-linking process. Further, Equation 1 may also be accomplished by an additional surface cross-linking process.

The granular super absorbent polymer according to one embodiment of the present invention may be polymerized by including a reaction control material during polymerization.

Such a reaction control material may include, for example, dimer of acrylic acid monomer, acrolein, furfural, maleic acid anhydride, protoanemonin, or the like. These compounds may influence reactivity of polymerization and surface cross-linking reaction.

The dimer of acrylic acid monomer useable in the present invention is resulted from two equivalents-polymerization of the acrylic acid monomer, and in particular, means dimers of acrylic acid, acrylate or a mixture thereof. A content of the dimer of the acrylic acid monomer added during polymerization is not particularly limited but may range from 0.1 to 1,000 ppm, and preferably, 0.1 to 500 ppm to a total weight of monomers for polymerization of the granular super absorbent polymer.

If the dimer is added in an amount within the above range, reactivity may be uniformly maintained during polymerization and cross-linking reaction, and thereby enabling production of a super absorbent polymer with a uniform cross-linking structure.

If the added amount is beyond the above range, a ratio of the dimer participating in the polymerization is increased to generate irregular reactants in the resin and may cause extractables to be excessively generated.

A content of the reaction control material selected from a group consisting of acrolein, furfural, maleic acid anhydride, protoanemonin and a combination thereof is not particularly limited, but, the above compound may be respectively, if added, in an amount of 0.1 to 15 ppm, and for example, 0.1 to 10 ppm, to a total weight of the monomer for polymerization of the granular super absorbent polymer according to an embodiment of the present invention. When the above compound is included in the above range, reactivity may be uniformly maintained during polymerization and cross-linking reaction, and thereby forming a super absorbent polymer having a high molecular weight at a high yield. Further, a super absorbent polymer having a uniform cross-linking structure may be produced. If the above compound is beyond the above range, the material containing a double-bond may affect the reaction, therefore, the extractables may be excessively generated in the resin.

Meanwhile, the granular super absorbent polymer according to another embodiment of the present invention may include a monomer residue, which did not come under reaction during polymerization, or after completion of the polymerization. An amount of such a monomer residue may range from 0.1 to 400 ppm, and for example, 0.1 to 300 ppm, relative to a weight of the granular super absorbent polymer. Within the above range, skin problem inhibition or other effects may be more improved. Further, it is considered that, if the monomer residue is included in the above range while exhibiting a proper range of flow conductivity of the super absorbent polymer, the physical properties of the product may be more improved.

The granular super absorbent polymer according to one or more embodiments of the present invention may exhibit excellent flow conductivity when the water-solubility index is within the above range. For example, the granular super absorbent polymer may have a flow conductivity of 10 darcy or more, and for example, 25 darcy or more. Within the above range, when the inventive resin is applied to a product, it can effectively distribute a liquid provided from any external source and all moisture-absorbent polymer particles may uniformly absorb the liquid. Further, it is considered that the resin may have excellent flow conductivity and excellent wearable sense, and minimize skin stimulation caused by chemical substances.

The super absorbent polymer according to one embodiment of the present invention may be polymerized by including a comonomer having a hydroxyl group, wherein the comonomer may have at least two hydroxyl groups in a molecule.

It is considered that, when using the comonomer, the hydrophilic hydroxyl group may induce additional reaction under appropriate conditions after polymerization, thus more effectively reducing extractables. Accordingly, it is determined that physical properties of a product may be more improved by effectively satisfying the water-solubility index of the present invention, <Preparation of Super Absorbent Polymer>

Further, the present invention provides a method of preparing the super absorbent polymer according to the present invention.

Hereinafter, the method of preparing a super absorbent polymer according to one embodiment of the present invention will be described in detail.

The method of preparing a super absorbent polymer according to one embodiment of the present invention may include polymerization, drying, grinding and surface cross-linking processes, so as to produce a granular super absorbent polymer satisfying the water-solubility index represented by Equation 1 described above.

Polymerization Process

A polymerization process may be conducted by reaction of a polymeric solution including a monomer and a cross-linking agent.

The monomer possibly usable in the polymerization may be selected from acrylic acid and salts thereof. When using acrylic acid, it is advantageous that physical properties of the polymerized resin may become excellent. Polymerization of acrylic acid may be accelerated by alkalization to produce a salt thereof. For example, treatment using alkaline-metal hydroxide, ammonia and organic amine may promote the polymerization. Among these, in order to prepare a super absorbent polymer for improving polymeric ability of an acrylic acid monomer component and achieving more excellent physical properties, treatment using the alkaline-metal oxide, for example, sodium hydroxide or potassium hydroxide is preferably applied. During alkalization, in order to increase a transition temperature, it is preferable to apply a specific polymerization condition wherein an alkaline material is include in an amount of 40% by mol ('mol. %') to acrylic acid.

A content of the monomer is not particularly limited but, for example, may range from 10 to 80% by weight ('wt. %'), and preferably, 30 to 60 wt. % to a total weight of the polymeric solution. When the monomer is included within the above content range, reactivity of the polymerization may be more improved.

With regard to the method of preparing a super absorbent polymer according to another embodiment of the present invention, a comonomer having a hydroxyl group may be further used other than the base monomer of acrylic acid and salts thereof described in the polymerization process above. In this case, the comonomer may have at least two hydroxyl groups in a molecule.

According to an embodiment of the present invention, if using a comonomer having a hydroxyl group, it is considered that the hydroxyl group may induce additional reaction under appropriate conditions after polymerization, thus more effectively reducing extractables. Accordingly, it is understood that the water-solubility index may be effectively satisfied to thus more improve physical properties of the product.

The comonomer having a hydroxyl group may include, for example, hydroxymethyl acrylate, hydroxyethyl acrylate, hydroxypropyl acrylate, hydroxymethyl acrylamide, hydroxyethyl acrylamide, 1,3-dihydroxy-2-propanyl acrylate, 2,3-dihydroxypropanyl acrylate, 2-methylene-1,3-propandiol, trihydroxymethyl acrylate, trihydroxyethyl acrylate, trihydroxymethyl acrylamide, N-tri(hydroxymethyl) methyl acrylamide, trihydroxyethyl methacrylamide, methylenepropanediol, or the like. Preferably, N-tri(hydroxymethyl)methyl acrylamide, 1,3-dihydroxy-2-propanyl acrylate, 2,3-dihydroxyparopanyl acrylate or 2-methylene-1,3-propandiol is used. These compounds may be used alone or in combination of two or more thereof, however, not particularly limited thereto.

A content of the comonomer having a hydroxyl group is not particularly limited but, for example, may range from 0.1 to 10 mol. %, and preferably, 0.5 to 3 mol. %, to the polymeric solution. When the comonomer is included within the above content range, reactivity of the polymerization may be more improved.

The cross-linking agent used herein may be any one widely used in the related art, and selected from compounds having functional groups reactable with a water-soluble substituent in the monomer. The internal cross-linking agent may include, for example, bis acrylamide or bismethacrylamide having 8 to 12 carbon atoms, poly(meth)acrylate of polyol having 2 to 10 carbon atoms, and poly(meth)allylether of polyol having 2 to 10 carbon atoms, or the like. More particularly, N,N'-methylene bis(meth)acrylamide, (poly)ethyleneglycol di(meth)acrylate, (poly)propyleneglycol di(meth)acrylate, trimethyolpropane tri(meth)acrylate, glycerin tri(meth)acrylate, glycerol acrylate methacrylate, ethyleneoxide modified trimethylolpropane tri(meth)acrylate, pentaerythritol hexa(meth)acrylate, triallyl cyanurate, triallyl isocyanurate, triallyl phosphate, triallylamine, poly(meth)allyloxyalcane, (poly)ethyleneglycol diglycidylether, glycerol diglycidylether, ethyleneglycol, polyethyleneglycol, propyleneglycol, glycerin, pentaerythritol, ethylenediamine, ethylene carbonate, propylene carbonate, polyethylenimine, glycidyl(meth)acylate, or the like, may be exemplified. These compounds may be used alone or in combination of two or more thereof, however, it is not particularly limited thereto.

A content of the cross-linking agent is not particularly limited but, for example, may range from 0.001 to 3 mol. %, and preferably, 0.01 to 1 mol. % to the polymeric solution. When the cross-linking agent is included within the above content range, reactivity of the polymerization may be more improved.

The polymeric solution may have more preferable physical properties for polymerization when oxygen dissolved in a monomer component is substituted with inert gas under inert gas atmosphere. The inert gas may be selected from, for example, nitrogen or argon gas.

The reaction of the polymeric solution may be conducted by any one selected from thermal polymerization and photo-polymerization. In particular, the thermal polymerization may be performed by selecting any one among redox polymerization to polymerize at a temperature of 25 to 50° C. for 2 to 30 minutes, and heat polymerization to polymerize at a temperature of 40 to 90° C. for 2 to 30 minutes. Further, the photo-polymerization may be performed by irradiating UV light at a temperature of 25 to 99° C. for 10 seconds to 5 minutes. In order to produce a hydrogel phase polymer having a low content of extractables and more excellent physical properties, the photo-polymerization is preferably selected.

The polymerization may be conducted by adding a polymerization initiator. Such a polymerization initiator may include any one commonly used in the related art, which may be suitably selected and added according to any method for polymerization. The polymerization initiator may include at least one selected from a group consisting of, for example, azo-based initiator, peroxide-based initiator, redox-based initiator, organic halogenated compound initiator, acetophenone, benzoin, benzophenone, benzyl compound and derivatives thereof. Further, a photo-polymerization initiator may include, specifically, at least one selected from a group consisting of acetophenone, benzoin, benzophenone, benzyl compound and derivatives thereof, for example, at least one initiator selected from a group consisting of diethoxyacetophenone, 2-hydroxy-2-methyl-1-phenylpropan-1-on, 4-(2-hydroxyethoxy)phenyl-(2-hydroxy)-2-propylketone, 4-benzoyl-4'-methyl-diphenyl sulfide and azo-based compound.

A content of the polymerization initiator is not particularly limited but, for example, may range from 0.001 to 3 mol. %, and preferably, 0.01 to 1 mol. % to the polymeric solution. When the polymerization initiator is included within the above content range, reactivity of the polymerization may be more improved.

A hydrogel obtained by polymerization of the above polymer composition may optionally undergo a grinding process of hydrogel, as necessary. Such a hydrogel grinding process may be conducted by gel grinding performance using a kneader, mincer, planetary mixer and/or hammer mixer, or the like.

In the method of preparing a super absorbent polymer according to one embodiment of the present invention, the polymer solution used for polymerization may include a reaction control material such as dimer of acrylic acid monomer, acrolein, furfural, maleic acid anhydride, protoanemonin, etc. Herein, when the reaction control material is included within the above range, reactivity may be uniformly maintained during polymerization and cross-linking reaction, so as to form the super absorbent polymer having a high molecular weight at a high yield. Furthermore, a super absorbent polymer having a uniform cross-linking structure may be produced. If it is beyond the above range, extractables may be excessively generated in the resin.

Extrusion Process

In the method of preparing a super absorbent polymer according to one embodiment of the present invention, an extrusion process may be further conducted after the polymerization described above. In this case, the polymerization initiator and surface cross-linking agent may be introduced during the extrusion.

By introducing the polymerization initiator and surface cross-linking agent during the extrusion, cure efficiency of the super absorbent polymer may be more improved. Further, by satisfying the water-solubility index represented by Equation 1 of the present invention, physical properties of the product may also be more improved.

The polymerization initiator may use the same polymerization initiator as described above. Further, the surface cross-linking agent may use the same surface cross-linking agent as used in the surface cross-linking process to be described below.

Optionally, an absorbent polymer powder having an average particle diameter of 150 μm or less may be further introduced during the extrusion.

According to a grinding process of the absorbent polymer to be described below, particles having different particle sizes may be obtained. Even microfine powder having a size useless for a product, for example, an absorbent polymer powder having an average particle diameter of 150 μm or less may be generated. According to an embodiment of the present invention, such micofine powders are also introduced during the hydrogel extrusion, thus recycling the microfine powder.

The extrusion process may be conducted using any instrument for extrusion-molding such as a mono-axial screw extruder, twin-axial screw extruder, kneader, mixer, etc.

In particular, an extrusion solution used for extrusion may include polyvalent metals, polyvalent metal salts, and an aqueous solution (or alcohol solution) including a mixture thereof. In this regard, metals used in the extrusion are not particularly limited but may include, for example, alkaline metal, alkali-earth metal, aluminum, zinc, zirconium, or the like. Particular examples of the metal salt may include sulfates, persulfates, acetates or hydrochlorides of the above metals, or the like, which may be used alone or in combination of at least one thereof.

Drying Process

With regard to the method of preparing a super absorbent polymer according to one embodiment of the present invention, the polymerized/extruded hydrogel may have controlled water content rate according to a drying process.

A dry temperature and dry time of the hydrogel may be properly selected under desirable conditions based on the water content rate of the produced hydrogel. Preferably, the drying process may be conducted under a temperature condition of 150 to 200° C. for 20 to 60 minutes. If the dry temperature is less than 150° C., drying effect may be reduced and a dry time may be elongated. When the dry temperature exceeds 200° C., the hydrogel may be deteriorated to cause reduce absorption ability. The hydrogel obtained by the drying process may have a water content rate of 1 to 10 wt. %.

Grinding Process

In the method of preparing a super absorbent polymer according to one embodiment of the present invention, the dried product may undergo grinding, which is not particularly limited in aspects of technical configurations thereof so long as it is conventionally used for grinding a resin. For example, the resin may be ground using a grinding device such as a pin mill, hammer mill, screw mill, roll mill, etc. A particle distribution, in which the super absorbent polymer of the present invention has excellent physical properties, may range from 150 to 850 μm in terms of diameters of respective particles.

The ground super absorbent polymer particle may further undergo the classification process, so as to match a particle distribution with the physical properties required in the product, to which the inventive resin particle is applied. The classification process may be conducted using a network mesh having holes formed at a predetermined interval through selective classification of a product having desired particle size.

Surface Cross-Linking Process

In the method of preparing a super absorbent polymer according to one embodiment of the present invention, the super absorbent polymer ground/classified as described above may further undergo a surface cross-linking process using a surface cross-linking agent after the grinding, thereby regulating a surface cross-linking density.

The surface cross-linking solution used for surface cross-linking may include a surface cross-linking agent and a solvent.

The surface cross-linking agent useable in the present invention is not particularly limited but may include any surface cross-linking agent known in the related art, for example, (i) polyalcohol compounds such as 1,3-propanediol, 1-methyl-1,3-propandediol, 2-methyl-1,3-propanediol, ethyleneglycol, diethyleneglycol, triethyleneglycol, tetraethyleneglycol, polyethyleneglycol, propyleneglycol, dipropyleneglycol, polypropyleneglycol, 2,3,4-trimethyl-1,3-pentanediol, glycerin, polyglycerin, 2-butene-1,4-diol, 1,4-butanediol, 1,3-butanediol, 1,5-pentanediol, 1,6-hexanediol, meso-erythritol, D-sorbitol, 1,2-cyclohexanedimethanol, hexanediol trimethylolpropane, pentaerythriotl, etc.; (ii) epoxy compounds such as ethyleneglycol diglycidylether, polyethyleneglycol diglycidylether, glycerol polyglycidylether, propyleneglycol diglycidylether, polypropyleneglycol diglycidylether, etc.; (iii) polymetal compounds such as hydroxides or chlorides of calcium, magnesium, aluminum, iron, etc.; (iv) oxazolidinone compounds such as N-acyl oxazolidinone compound, 2-oxazolidinone compound, etc. (U.S. Pat. No. 6,559,239); (v) alkylene carbonate compound such as 1,3-dioxolan-2-on (sometimes referred to as "ethylene carbonate"), 4-methyl-1,3-dioxolan-2-on, 4,5-dimethyl-1,3-dioxolan-2-on, 4,4-dimethyl-1,3-dioxolan-2-on, 4-ethyl-1,3-dioxolan-2-on, 4-hydroxymethyl-1,3-dioxolan-2-on, 1,3-dioxan-2-on, 4-methyl-1,3-dioxan-2-on, 4,6-dimethyl-1,3-dioxan-2-on, 1,3-dioxespan-2-on, etc. (U.S. Pat. No. 5,409,771); (vi) oxetane compound (3-ethyl-3-hydroxymethyl oxetane) and cyclic urea compound (2-imidazolidinone) (U.S. Patent Publication No. 2002/0072471); (vii) aminoalcohol compound such as ethanolamine, diethanolamine, etc. These compounds may be used alone or in combination of two or more thereof.

The solvent useable in the surface cross-linking process according to the present invention generally includes water. However, when it is mixed and used with an aqueous alcohol, the solvent may regulate a penetration depth of the surface cross-linking agent into the super absorbent polymer, to thus control a contact degree with extractables included in the particles. In particular, when the aqueous alcohol is included in an amount of 0.1 to 50 wt. %, and preferably, 1 to 30 wt. % to a total weight of the surface cross-linking solution, the water-solubility index represented by Equation 1 is satisfied while more increasing surface cross-linking efficiency. Therefore, it may more improve the flow conductivity of the super absorbent polymer while reducing a content of eluted extractables, thereby inhibiting an induction of skin problem.

Types of alcohol useable in the present invention are not particularly limited but may include, for example, methanol, ethanol, propanol, butanol, pentanol, butanol, hexanol, and isomers thereof. In consideration of solubility to water, methanol or ethanol is more preferably used. These compounds may be used alone or in combination of two or more thereof.

An amount of the surface cross-linking solution to be used is not particularly limited but, for example, may range from 1 to 10 wt. %, and preferably, 3 to 8 wt. %, to a total weight of the granular super absorbent polymer before surface cross-linking. Within the above amount range, the water-solubility index represented by Equation 1 may be satisfied while more increasing surface cross-linking efficiency.

A reaction condition for surface cross-linking is not particularly limited, however, the reaction may be executed at a temperature of 120 to 200° C. for 10 to 120 minutes. If the temperature is less than 120° C., reaction may not be performed. If the temperature exceeds 200° C., the super absorbent polymer may be deteriorated to cause reduction of absorption property.

Through surface cross-linking as described above, a surface cross-linking density of the super absorbent polymer may be controlled to improve fracture strength and impact strength of the super absorbent polymer, elution of extractables reacting with the surface cross-linking agent may be inhibited, and flow conductivity may be improved.

for example, of 10 darcy, and preferably, of 25 darcy. Within the above range, any liquid provided from the outside may be effectively distributed when the polymer is applied to a product, so as to enable all moisture-absorbent polymer particles to uniformly absorb the liquid.

Hereinafter, exemplary embodiments are proposed to more concretely describe the present invention. However, the following examples are only given for illustrating the present invention and those skilled in the art will obviously understand that various alterations and modifications are possible within the scope and spirit of the present invention. Such alterations and modifications are duly included in the appended claims.

TABLE 1

| | | | EXAMPLE | | | | COMPARATIVE EXAMPLE |
|---|---|---|---|---|---|---|---|
| | Section | | 1 | 2 | 3 | 4 | 1 |
| Polymerization process (synthesis of hydrogel) | Base monomer (A) (wt. %) | | 40 | 50 | 40 | 40 | 40 |
| | Reaction control material (B) (PPM to weight of A) | B-1 | 830 | 470 | 240 | 180 | 1,330 |
| | | B-2 | 13 | 9 | 2 | 1 | 22 |
| | | B-3 | 12 | 6 | 2 | 1 | 32 |
| | | B-4 | 11 | 7 | 1 | 1 | 28 |
| | | B-5 | 13 | 5 | 1 | 1 | 33 |
| | Cross-linking agent (C) (mol %) | | 0.03 | 0.03 | 0.03 | 0.03 | 0.03 |
| | Comonomer (D) (mol %) | | — | — | 2 | 2 | — |
| | Polymerization initiator (E) (mol %) | | 0.05 | 0.05 | 0.05 | 0.05 | 0.05 |
| Extrusion process | Extrusion solution (F) (to 100 wt. % of hydrogel) | | Aluminum sulfate/ $H_2O$ = 0.2/3 | Sodium persulfate/ Aluminum sulfate/$H_2O$ = 0.1/0.2/3 | — | Sodium persulfate/ Aluminum sulfate/$H_2O$ = 0.1/0.2/3 | — |
| Surface cross-linking process | Surface cross-linking solution (G) | Component (wt. ratio*) [Temperature, time] | 1,3-PD/PEO// MeOH/$H_2O$ = 0.2/0.3/0.1/3 [170° C., 90 min] | 1,3-PD/PEO// MeOH/$H_2O$ = 0.2/0.3/1/3 [170° C., 60 min] | 1,3-PD/PEO// MeOH/$H_2O$ = 0.2/0.3/1/3 [170° C., 60 min] | 1,3-PD/PEO// MeOH/$H_2O$ = 0.2/0.3/1/3 [170° C., 60 min] | 1,3-PD// MeOH/$H_2O$ = 0.5/3/3 [170° C., 60 min] |
| | Monomer residue (PPM to weight of resin) | | 360 | 290 | 250 | 230 | 820 |
| | Water-solubility index | | 1.8 | 1.2 | 0.6 | 0.2 | 2.2 |

A: acrylic acid-sodium acrylate (25/75 molar ratio)
B-1: dimer of acrylic acid and dimer of sodium acrylate
B-2: acrolaine
B-3: furfural
B-4: maleic acid anhydride
B-5: protoanemonin
C: trimethylolpropane trimethacrylate
D: N-[Tris(hydroxymethyl)methyl]acrylamide
E: igacure 184 (Ciba Co.)
G: 1,3-PD(1,3-propandiol)/MeOH(methanol)/PEO(polyethylene oxide, molecular weight = 500)
*A weight ratio of surface cross-linking solution (G) is a content to 100 wt. % of absorbent polymer before surface cross-linking After the surface cross-linking process, the granular super absorbent polymer may include a monomer residue. In this case, the monomer residue satisfies the predetermined content range as described above, thus, more improves functional effects such as inhibition of an induction of skin problem. Further, it is considered that, when satisfying the above content range while exhibiting the flow conductivity of the super absorbent polymer in desired range, the physical properties of the product may be more improved.

The granular super absorbent polymer prepared according to the present invention may satisfy the water-solubility index, exhibit excellent flow conductivity and absorption ability, and do not induce skin problems. Further, the granular super absorbent polymer prepared according to the present invention may exhibit excellent flow conductivity,

EXAMPLES AND COMPARATIVE EXAMPLE

After mixing acrylic acid monomer, ultrapure water (Mili-Q integral 3: Milipore Co.) and sodium hydroxide with constitutional compositions as stated in Table 1 above and cooling the mixed solution to 10° C., nitrogen purging was conducted for 30 minutes. Then, a polymerization initiator, internal cross-linking agent and comonomer were added to the above solution. After irradiating the above solution with a light of 500 mJ/cm$^2$ under conditions of a 5 mm liquid thickness and filling argon gas, the processed material was left for 6 minutes to prepare a gel sheet. Next, after cutting the prepared gel sheet to have a width of 10 mm or less, the cut sheet was passed through a hood mixer (SFD-G, Shin-sung Co. Lid.), thereby obtaining a hydrogel.

If necessary, a sample was prepared with an extrusion solution including ultrapure water stated in Table 1 as a solvent at predetermined proportions, and then, mixed with the obtained hydrogel by manual labor in a water-proof sealed bag. Thereafter, using a counter rotating twin screw extruder (Plasticorder DSK/42/7, Brabender Co.), the mixture was extruded with a rate of 30 RPM at 150° C.

Next, after spreading the obtained mixture over a mesh having a hole size of 150 µm to reach a thickness of 10 mm, the mixture was dried by a forced convention dryer (OF-02PW; JEIO Tech Co.). After elevating the temperature from an initial 30° C. to 80° C. for 10 minutes and drying the product for 30 minutes, the temperature was again elevated to 180° C. for 30 minutes followed by drying for 3 hours. After drying, the sample was stored in a chamber filled with dried air until it is cooled to room temperature.

The cooled solid was ground and classified using an ASTM standard mesh to select particles having a size of 150 to 850 µm only. Such grinding was conducted by a freeze mill (Freezer/Mill 6870; Spex SamplePrep Co.) for 20 minutes under a liquid nitrogen atmosphere. Classification was conducted using a mesh vibrator (Octagon 2000, Endecotts Co.) with 150/850 µm mesh at an intensity of 3 for 15 minutes.

A surface cross-linking agent, alcohol and ultrapure water were slowly mixed to prepare a surface cross-linking liquid composition, and uniformly mixed with the classified particles in a hood mixer (HMF-32605, Han-Il Electric Co.) while agitating the same for 1 minute under mild conditions. After spreading it with a thickness of about 10 mm over a mesh having a hole size of 150 µm, the temperature was elevated from an initial 30° C. to 60° C. by a forced convention drier (OF-02PW; JEIO Tech Co.) for 10 minutes followed by drying for 30 minutes. After then, the temperature was elevated to the temperature stated in Table 1 for 20 minutes followed by drying according to predetermined times. After drying, the sample was stored in a chamber filled with dried air until it is cooled to room temperature. The cooled solid was classified by an ASTM standard mesh to select particles having a size of 150 to 850 µm only.

(1) Measurement of Water-Solubility Index

For the granular super absorbent polymer prepared in the examples and comparative example according to Table 1, extractables in particles, water-solubility index and flow conductivity of the resin were measured. The measured water-solubility index and the flow conductivity were stated in Tables 1 and 2 below, respectively.

A1 is a content ratio of extractables in particle (a1) having an average diameter of 500 to 850 µm, A2 is a content ratio of extractables in particle (a2) having an average diameter of 150 to 250 µm, and A3 is a content ratio of extractables in particle (A) having an average diameter of 150 to 850 µm.

First, the above particles were separated, respectively, using 4 meshes with hole sizes of 150/250/500/850 um in classifiers. The others were measured by an EDANA method (WSP 220.2.R3).

Hereinafter, 2 g of each type of the particles was placed in 400 g brine, stirred with a stirrer bar at 500 rpm, followed by extraction of extractables at room temperature for 4 hours.

After the extraction, further processes such as filtering and sampling were conducted according to the EDANA method (WSP S270.2.R3), followed by titration to measure a content ratio of extractables.

(2) Measurement of Monomer Residue in Product

The resins prepared in the examples and comparative example were measured by HPLC according to the EDANA method (WSP 210.2.R3).

Test Procedure

1. Determination of Flow Conductivity

The super absorbent polymers prepared in the examples and comparative example according to Table 1 were subjected to determination of flow conductivity. The flow conductivity was determined by the same procedure as a gel phase flow conductivity (GBP) test method described in Korean Patent Registration No. 10-0873455, results thereof are shown in Table 2 below in terms of darcy unit.

2. Evaluation of Skin Problem and Fitting Sense

Using each of the super absorbent polymers prepared in the examples and comparative example according to Table 1, disposable absorbent products were fabricated. After selecting 50 candidates selected from women aged 20s to 30s as sensory test panel members, they were provided with the fabricated product to use it for 3 months. After then, skin irritation and wearable sense were tested according to the standard for evaluation below. Results thereof are shown in Table 2.

<Standard for Evaluation of Skin Problem>

◎: no skin friction or irritation is found
○: induction of more than 0 to 5% or less of skin friction or irritation
Δ: induction of more than 5 to 10% or less of skin friction or irritation
X: induction of more than 10% of skin friction or irritation <Standard for Evaluation of Wearable Sense>

◎: fully satisfied
○: satisfied
Δ: normal
X: unsatisfied

TABLE 2

| Section | Flow conductivity (darcy) | Skin problem evaluation | Wearable sense |
|---|---|---|---|
| Example 1 | 14 | ○ | ○ |
| Example 2 | 21 | ◎ | ○ |
| Example 3 | 38 | ◎ | ◎ |
| Example 4 | 42 | ◎ | ◎ |
| Comparative Example 1 | 4 | X | X |

Referring to Table 2, it could be seen that the examples have noticeably excellent flow conductivity as the water-solubility index of Equation 1 is within the inventive range, compared to Comparative Example 1, and show no induction of skin problems.

Also, it will be understood by those skilled in the art that that the scope of the present invention will be defined by the claims rather than the above-described description and all modifications and alternations derived from the claims and their equivalents are included in the scope of the present invention.

What is claimed is:

1. A granular super absorbent polymer, comprising particles (A) having an average diameter of 150 to 850 µm, wherein the particles (A) have extractables comprising first extractables and second extractables, and the particles (A) include:

a first set of particles having an average diameter of 500 to 850 μm, the first set of particles having the first extractables; and a second set of particles having an average diameter of 150 to 250 μm, the second set of particles having the second extractables, wherein the first and second sets of the particles have a water-solubility index of 0.08 to 2.0, which is represented by Equation 1 below:

Water-solubility index=positive square root of $[(A1-A2)^2/A3]$ [Equation 1]

wherein A1 is a weight ratio of the first extractables to a total weight of the first set of particles, A2 is a weight ratio of the second extractables to a total weight of the second set of particles, and A3 is a weight ratio of a total weight of the extractables in the particles (A) to a total weight of the particles (A).

2. The granular super absorbent polymer according to claim 1, wherein the water-solubility index ranges from 0.09 to 1.4.

3. The granular super absorbent polymer according to claim 1, wherein the water-solubility index ranges from 0.1 to 0.7.

4. The granular super absorbent polymer according to claim 1, further comprising a monomer residue, wherein a weight of the monomer residue to a weight of the super absorbent polymer ranges from 0.1 to 400 ppm.

5. The granular super absorbent polymer according to claim 1, wherein a flow conductivity of the granular super absorbent polymer is 10 darcy or more.

6. The granular super absorbent polymer according to claim 1, wherein a flow conductivity of the granular super absorbent polymer is 25 darcy or more.

7. A granular super absorbent polymer prepared by a method comprising:

polymerizing a monomer by reacting a polymeric solution comprising the monomer, a cross-linking agent and at least one of a comonomer and a reaction control material, the comonomer having at least two hydroxyl groups and being different from said monomer to obtain a polymerized product;

drying the polymerized product to obtain a dried product;

grinding the dried product to obtain a ground product; and surface cross-linking the ground product to obtain a granular super absorbent polymer, wherein the granular super absorbent polymer comprises particles (A) having an average diameter of 150 to 850 pm, and a monomer residue, wherein the particles (A) have extractables comprising first extractables and second extractables, and the particles (A) include:

a first set of particles having an average diameter of 500 to 850 μm, the first set of particles having the first extractables; and a second set of particles having an average diameter of 150 to 250 μm, the second set of particles having the second extractables, wherein the first and second sets of the particles have a water-solubility index of 0.08 to 2.0, which is represented by Equation 1 below:

Water-solubility index=positive square root of $[(A1-A2)^2/A3]$ [Equation 1]

wherein A1 is a weight ratio of the first extractables to a total weight of the first set of particles, A2 is a weight ratio of the second extractables to a total weight of the second set of particles, and A3 is a weight ratio of the extractables in the particles (A) to a total weight of the particles (A); and wherein a weight of the monomer residue to a weight of the super absorbent polymer ranges from 0.1 to 400 ppm.

8. The granular super absorbent polymer according to claim 7, wherein the reaction control material is a dimer of an acrylic acid monomer in an amount of 0.1 to 1,000 ppm to a total weight of the monomer to be polymerized into the super absorbent polymer.

9. The granular super absorbent polymer according to claim 7, wherein the reaction control material is at least one selected from a group consisting of acrolein, furfural, maleic acid anhydride and protoanemonin, and the reaction control material is added in an amount of 0.1 to 15 ppm to a total weight of the monomer to be polymerized into the super absorbent polymer.

10. The granular super absorbent poly according to claim 7, wherein the surface cross-linking solution includes aqueous alcohol in an amount of 0.1 to 50% by weight to a total weight of the solution.

* * * * *